March 27, 1928.
P. A. ANDERSON
LAWN MOWER GRINDER
Filed May 8, 1925
1,663,823
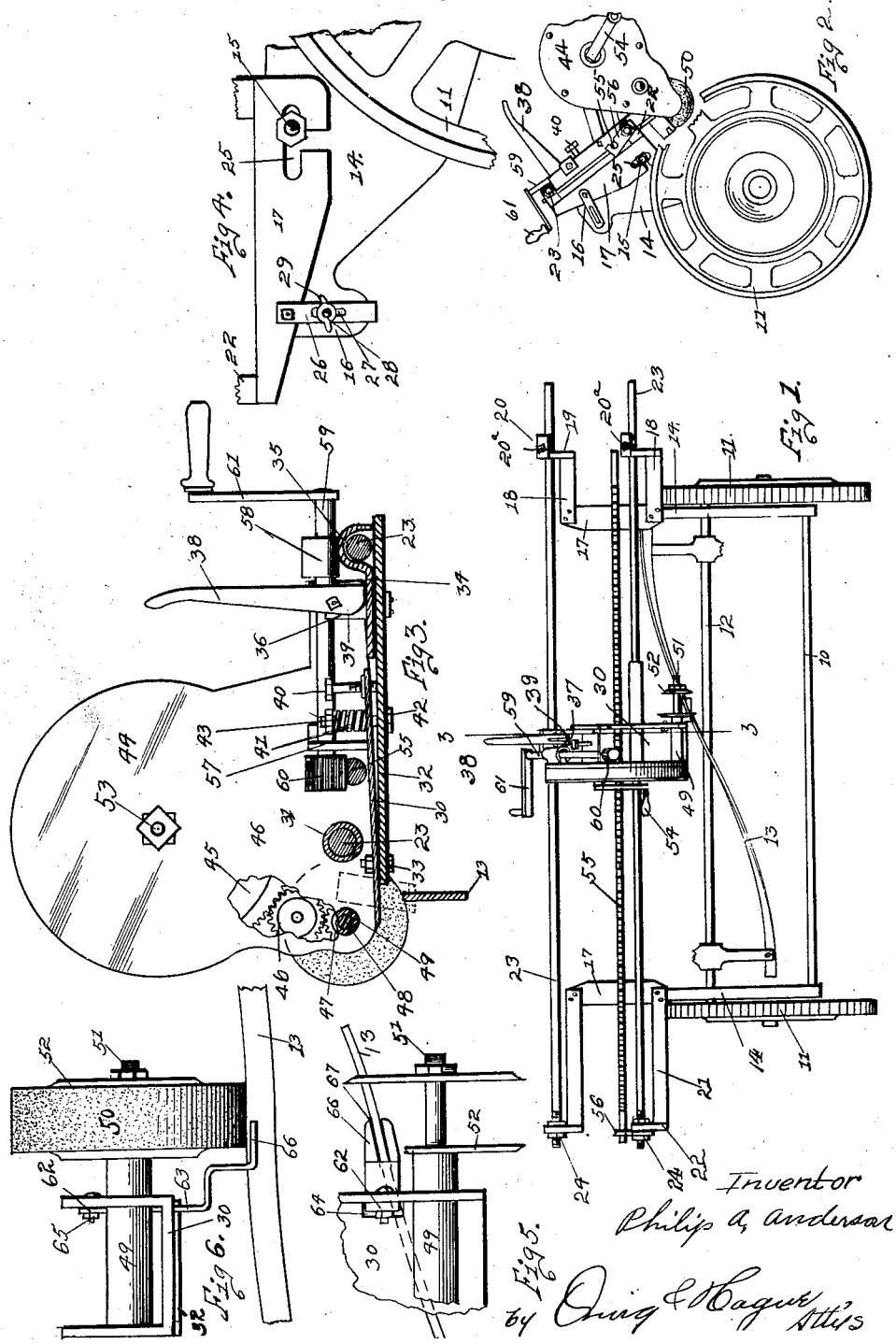
Inventor
Philip A. Anderson Patented Mar. 27, 1928.

1,663,823

UNITED STATES PATENT OFFICE.

PHILIP A. ANDERSON, OF ATLANTIC, IOWA.

LAWN-MOWER GRINDER.

Application filed May 8, 1925. Serial No. 28,858.

The object of my invention is to provide a grinder of simple, durable and inexpensive construction which may be easily and quickly attached to a lawn mower, and when so attached provide means whereby the blades of the lawn mower cutter may be accurately sharpened so that they will properly register with the ledger plate when in operation.

A further object is to provide in a grinder for lawn mowers improved means for securing the sharpener to the lawn mower frame so that the blades will be accurately sharpened.

My invention consits in the construction, arrangement and combination of the various parts of the device, whereby the objects contemplated are attained, as hereinafter more fully set forth, pointed out in my claims, and illustrated in the accompanying drawings, in which:

Figure 1 is a front elevation of my improved grinder showing the manner in which it is attached to a lawn mower.

Figure 2 is an end elevation of the same.

Figure 3 is an enlarged, detail, sectional view taken on the line 3—3 of Figure 1.

Figure 4 is an enlarged detail view showing the manner in which the device is attached to a lawn mower frame.

Figure 5 is a plan view of a portion of the main frame showing in detail the device for guiding the cutter blade relative to the grinder, the grinder being omitted; and Figure 6 is an end elevation of same, the grinder being shown in operative relation with the cutter blade.

The numeral 10 indicates the supporting frame of a lawn mower which is provided with the usual wheels 11 and a rotary cutter shaft 12, said shaft 12 being provided with helical cutter blades 13, only one of said blades being illustrated. The lawn mower frame 10 is provided with side members 14 between which the ledger plate and supporting rollers are mounted, said ledger plate and supporting roller being removed. The ledger plate is secured in position by means of bolts 15, the pivot members of the rollers being removed from the bearings 16.

My improved device comprises a pair of supporting angles 17. One of the members 17 is provided with outwardly extending frame members 18. The outer end of each of the members 18 is provided with an upwardly extending portion 19, the upper end of which is provided with an outwardly extending portion 20. The other member 17 is provided with outwardly extending frame members 21, each having at its outer ends an upwardly extending portion 22.

The members 19 and 22 are provided with guide rods 23 which are arranged parallel with each other and spaced apart. One end of the guide rods 23 is screw threaded and provided with nuts 24, by means of which the threaded ends of the rods are secured to the members 22. The opposite ends of the rods 23 extend through openings in the members 19 in such a manner that the said members 19 are slidably mounted on said rods. Each of the members 20 is provided with a set screw 20$^a$ for locking said members 19 in their adjusted position, and provides means whereby the members 17 may be moved toward or from each other to fit lawn mower frames of different dimensions.

The downwardly extending flange of each of the members 17 is provided with a T-shaped slot 25. Said members 17 are designed to rest adjacent to the frame members 14 with the bolts 15 extending through the slot 25. This provides means whereby the frame members 17 may be adjusted toward or from the cutter blades 13. The outer ends of the members 17 are supported by means of pivoted bars 26 which are provided with slots 27. Said slots 27 are each provided with a bolt 28 designed to extend through the opening of the bearing 16 from which the roller pins have been removed, and through the slot 27. A thumb nut 29 is provided for locking the bar 26 adjacent to the bearing 16. The pivoted bars 26, together with the bolts 15, provide means whereby the grinder frame may be rigidly connected to the lawn mower frame.

Slidably mounted on the guides 23 is the grinder frame which comprises substantially a channel bar 30 which extends transversely with the said guides 23, one end of the channel 30 being provided with a transversely arranged sleeve 31 which is slidably mounted on the inner one of the rods 23. The channel 30 is so constructed that it is slidably mounted on the shafts 23 and rotatively mounted thereon with its outer end extending inside of the outer guide 23.

Secured to the bottom of the channel 30 I have provided a plate 32 which is pivotally secured thereto by means of a bolt 33. The outer end of the member 32 is extended beneath the outer one of the rods 23, as clearly shown in Figure 3. The outer end of the member 32 is provided with a strap iron 34 which lies loosely on top of the member 32 and has at its outer end an upwardly curved portion 35 designed to form a semi-circular bearing designed to rest on top of the shaft 23. A support 36 is secured to the member 32 and extends upwardly through an opening 37 in the plate 34. A lever 38 is pivoted to the upper end of the member 36 and has at its lower end a cam shaped portion 39 designed to engage the upper surface of the plate 34 in such a manner that as the lever 38 is rotated about its pivot, the cam portion 39 will engage the upper surface of the plate 34 and elevate the plate 32 to move its outer end toward and from the under surface of the rod 23. This provides means for moving the grinder hereinafter described toward and from the cutter blade 13.

The outer end of the bottom portion of the angle 30 is provided with a set screw 40 by means of which the said outer end of the member 30 may be elevated or lowered relative to the member 32. The spring 41 is provided for yieldably moving the member 30 toward the member 32, the said spring 41 being mounted on a bolt 42 which is provided with a nut 43 for bearing the tension of the spring.

One of the upwardly extending flanges of the members 30 is provided with a gear casing 44 which is provided with a gear 45, an intermediate gear 46 in mesh with the same and a pinion gear 47 mounted on the grinder shaft 48, one end of which extends into said gear casing. Said grinder shaft is carried by a sleeve 49 which extends through the upwardly extending flanges of the member 30.

The shaft 48 has mounted on its outer end the grinder wheel 50 by means of a threaded portion 51 on the grinder shaft and the plates 52 in the usual manner. The gear 45 is mounted on a crank shaft 53 having a crank 54 on one end which is designed to be operated manually.

For sliding the grinder frame longitudinally of the guides 23, I have provided a rack bar 55, one end of which is secured to a plate 56 which in turn is secured to one of the members 22. The rack bar 55 extends substantially parallel with the rods 23 and transversely through the upright members of the channel 30. Said channel 30 is provided with bearings 57 and 58 which are designed to receive a crank shaft 59, the inner end of which is provided with a pinion 60 designed to coact with the teeth of the rack 55. The outer end of the shaft 59 is provided with a crank 61 which provides means whereby the grinder may be moved longitudinally of the guides 23. This is accomplished by rotating said crank, which in turn will rotate the shaft 59 together with the gear 60, by means of which the grinder frame is moved relative to said guides.

Mounted on the forward end of the channel 49 is a cutter blade guide 62 which comprises an upright portion 63 which extends through an opening 64 in the bottom of the member 30 and is designed to be bolted adjacent to the inner face of one of the upright flanges of the member 30 by means of a bolt 65. The lower end of the member 63 is provided with a horizontally arranged portion 66 which has a notch 67 running slightly angular with the shaft 51. The notch 67 is designed to receive and guide the blade 13, as clearly illustrated in Figures 5 and 6, so as to retain the said blade in proper relation with the grinder 50.

It will be seen that if the grinder carriage is moved longitudinally of the guides, the cutter 12 will be rotated so that the edge of the blade is always in contact with the grinder 50 during the entire movement of the carriage from one side of the cutter frame to the other.

In mounting the grinder frame, I first rotate the cutter blades 13 relative to the ledger plate and mark any such blades that engage the said ledger plate at their ends. I then remove the ledger plate and also the supporting roller, after which I clamp the grinder in position as before described. Before setting the grinder permanently I rotate the marked blade into position in front of the grinder and adjust the frame until said grinder engages the blade at the marked point, which is accomplished by first moving the lever 38 to a vertical position as shown in Figure 3, which will cause the grinder 50 to be moved to its normal grinding position. I then throw the upper end of the lever 38 inwardly permitting the outer end of the plate 32 to be lowered, which will cause the grinder to be elevated from the blade. I then slide the carriage to the opposite side of the mower and adjust the grinder to the blades at said opposite end, and then lock the grinder frame in position. The grinder is then ready for operation.

After moving the carriage to one end the crank 61 is grasped and also the crank 54, the grinder being operated by the last said crank and the carriage moved longitudinally of the guides with the crank 61. All of the blades are ground in this manner, after which the carriage is again moved to the point of beginning and the set screw 40 slightly adjusted to move the grinder closer to the blade in such a manner that a new cut may be made. The blades are again passed through the grinder after which the grinder may be removed and the ledger plate and the roller replaced.

Thus it will be seen I have provided a grinder of simple, durable and inexpensive construction which may be easily and quickly attached, and which will accurately grind the blades of a lawn mower.

I claim as my invention:

1. In a grinder for mowing machines comprising a supporting frame, means for securing said frame to a lawn mower having a rotatively mounted cutter bar, a pair of guide bars in said frame arranged parallel with the axis of said cutter bar and in fixed relation therewith, a grinder frame pivotally and slidably mounted on one of said guide bars, a grinder mounted in said frame, said grinder being so located that when the said frame is adjusted about its pivot the grinder will be moved toward and from said cutter bar, a plate having one edge pivotally mounted to the inner edge of said grinder frame, a bearing plate slidably mounted on the other of said guide bars, means carried by said bearing plate for moving said first plate toward and from said second guide bar, the outer edge of said grinder frame being provided with a set screw designed to engage said first plate for adjusting said grinder frame relative to said first plate, and a spring for yieldably holding the outer end of said grinder frame inwardly toward said first plate.

2. In a grinder for mowing machines comprising a supporting frame, means for securing said frame to a mower having a rotary cutter blade, inner and outer guide bars supported in said frame parallel with the axis of said cutter, a grinder frame pivotally and slidably mounted on the inner one of said guide bars, a grinder mounted in said frame, said grinder being mounted in such a manner that when the grinder frame is adjusted about its pivot the grinder member will be moved toward and from the cutter blade, a bearing plate on said outer guide bar, a second plate beneath said guide bars and said grinder frame, the inner edge of said second plate being pivotally connected to the inner edge of said grinder frame to allow a slight angular adjustment, a set screw for moving the outer end of said grinder frame outwardly from said second plate, a spring for yieldably moving the outer end of said grinder frame toward said second plate, and hand actuated means carried by said bearing plate for imparting movement to said second plate to thereby move said grinder frame to bring the grinder in contact with the cutter blade, substantially as described and for the purposes stated.

3. In a grinder for mowing machines comprising a supporting frame, means for securing said frame to a mower having a rotary cutter blade, inner and outer guide bars supported in said frame parallel with the axis of said cutter, a grinder frame pivotally and slidably mounted on the inner one of said guide bars, a grinder mounted in said frame, said grinder being mounted in such a manner that when the grinder frame is adjusted about its pivot the grinder member will be moved toward and from the cutter blade, a bearing plate on said outer guide bar, a second plate beneath said guide bars and said grinder frame, the inner edge of said second plate being pivotally connected to the inner edge of said grinder frame to allow a slight angular adjustment, a set screw for moving the outer end of said grinder frame outwardly from said second plate, a spring for yieldably moving the outer end of said grinder frame toward said second plate, hand actuated means carried by said bearing plate for rotating said second plate to thereby move said grinder frame to bring the grinder in contact with the cutter blade, means for imparting movement to said grinder, and means for moving said grinder frame longitudinally of said guide bars.

Des Moines, Iowa, April 20, 1925.

PHILIP A. ANDERSON.